United States Patent
Kwon et al.

(10) Patent No.: US 7,693,411 B2
(45) Date of Patent: Apr. 6, 2010

(54) MOBILE TERMINAL AND AUTO-FOCUSING METHOD USING A LENS POSITION ERROR COMPENSATION

(75) Inventors: Seong Geun Kwon, Daegu Metropolitan (KR); Chan Ho Han, Daegu Metropolitan (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 284 days.

(21) Appl. No.: 11/801,672

(22) Filed: May 10, 2007

(65) Prior Publication Data
US 2008/0124068 A1 May 29, 2008

(30) Foreign Application Priority Data
May 11, 2006 (KR) .................... 10-2006-0042691

(51) Int. Cl.
*G03B 3/00* (2006.01)
*G03B 13/00* (2006.01)
*G02B 7/04* (2006.01)

(52) U.S. Cl. ................. 396/127; 396/80; 396/93; 348/345; 250/201.2

(58) Field of Classification Search ............... 396/127, 396/79, 80, 82, 93, 102, 103, 104, 131; 348/345, 348/347; 250/201.2, 201.4, 201.7, 201.8
See application file for complete search history.

(56) References Cited

U.S. PATENT DOCUMENTS

| | | | | |
|---|---|---|---|---|
| 5,040,228 | A | 8/1991 | Bose et al. | 382/8 |
| 6,130,417 | A | 10/2000 | Hashimoto | 250/201.2 |
| 6,342,922 | B1 | 1/2002 | Mizoguchi | 348/355 |
| 2005/0247854 | A1 | 11/2005 | Hsieh | |
| 2005/0275743 | A1 | 12/2005 | Kikuchi | |
| 2006/0210259 | A1 | 9/2006 | Matsumoto | |
| 2007/0047942 | A1* | 3/2007 | Chang et al. | 396/133 |

FOREIGN PATENT DOCUMENTS

EP 06-014237 1/1994

\* cited by examiner

*Primary Examiner*—Rochelle-Ann J Blackman
(74) *Attorney, Agent, or Firm*—Cha & Reiter, LLC

(57) ABSTRACT

A mobile terminal and auto-focusing method for the same are disclosed. The auto-focusing method uses a lens position error compensation and includes: detecting a target object during a photograph mode; determining a lens position at which a focus value gradient related to the detected target object changes sign while moving a lens of the camera module in units of one step size; and performing lens position compensation by moving the lens to the found lens position. As a result, the lens position errors caused by a conventional a voice coil motor are compensated, thereby providing rapid and fine auto-focusing.

24 Claims, 15 Drawing Sheets

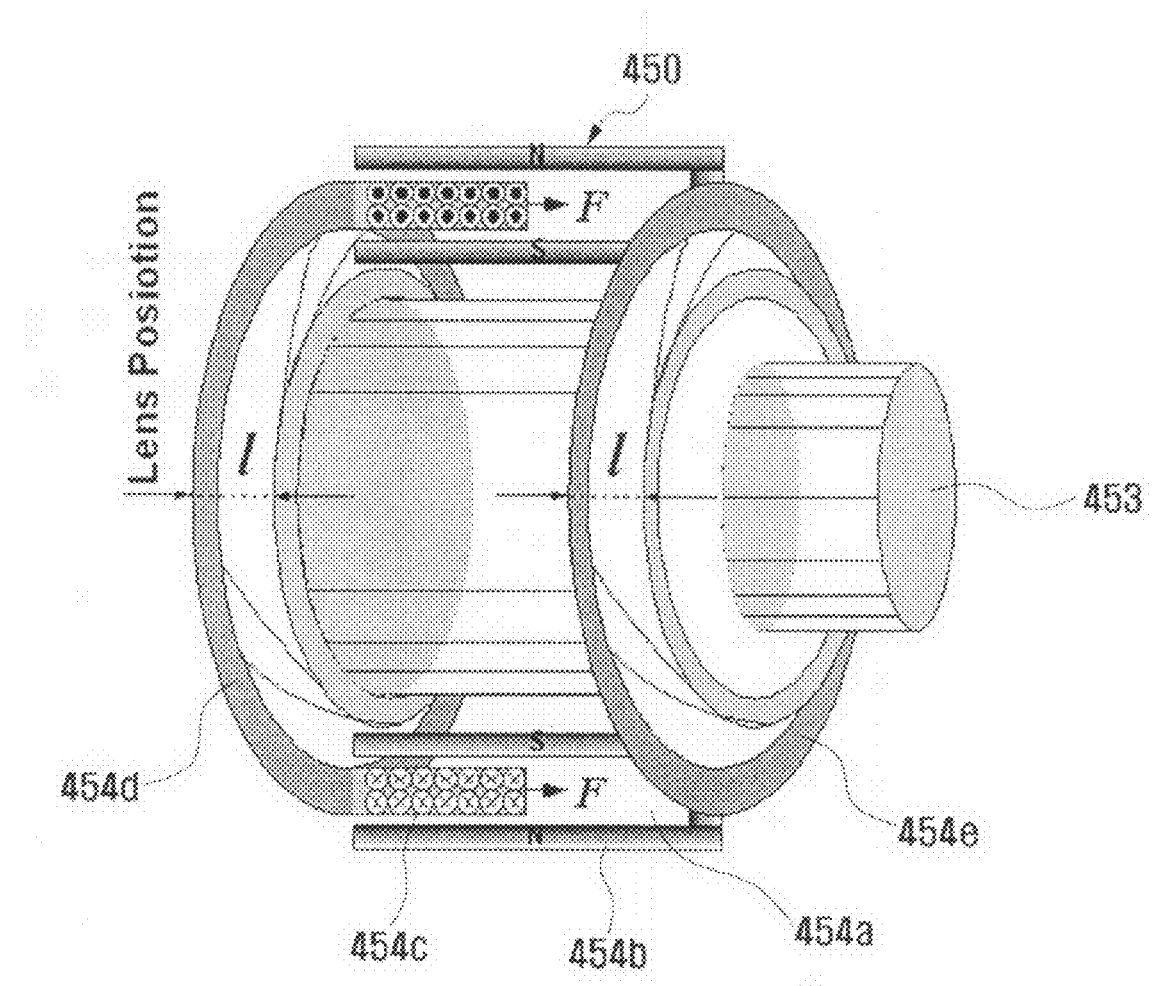

MOBILE TERMINAL AND AUTO-FOCUSING METHOD USING A LENS POSITION ERROR COMPENSATION

CLAIMS OF PRIORITY

This application claims priority to an application entitled "MOBILE TERMINAL AND AUTO-FOCUSING METHOD USING LENS POSITION ERROR COMPENSATION," filed in the Korean Intellectual Property Office on May 11, 2006 and assigned Serial No. 2006-0042691, the contents of which are incorporated herein by reference.

BACKGROUND OF THE INVENTION

1. Field of the Invention

The present invention relates generally to a mobile terminal having a camera module and, more particularly, to a mobile terminal and auto-focusing method for the same which enable rapid and accurate auto-focusing through compensation of lens position errors due to characteristics of a voice-coil motor (VCM).

2. Description of the Related Art

Advances in information and communication technologies have enabled a rapid growth in utilization of mobile terminals. Today, advanced mobile terminals support additional functions, such as text message and image transmission, MPEG-1 Audio Layer 3 (MP3) audio file playing, gaming, and photographing.

A mobile terminal having a camera module provides an auto-focusing function. To facilitate the movement of a lens for auto-focusing in a small and thin mobile terminal, a small voice-coil motor (VCM) is preferred as an actuator, instead of the conventional step motor.

FIG. 1 is a graph illustrating a lens position-to-focus value relationship in a conventional mobile terminal. Auto-focusing requires finding the maximum focus value for optimum focus in a focus value curve according to the movement of lens positions. Normally, a hill-climbing search algorithm is used to find this maximum focus value. A conventional hill-climbing search algorithm utilizes a two-stage search process for rapid convergence, as illustrated in FIG. 2.

In the first stage, the lens is repeatedly moved forwards in the unit of a first step size, which represents the distance of lens movement in a single move, until the focus value gradient changes sign. A gradient change occurs when the current focus value after the most recent lens move is less than the previous focus value. Upon detection of the gradient sign change, the second stage begins. In the second stage, the lens is repeatedly moved backwards in unit of a second step size less than the first step size until the focus value gradient changes sign.

In the case where the maximum lens displacement (maximum stroke) is evenly divided by 256, the first step size is +16 (plus for forward lens movement), and the second step size is −2 (minus for backward lens movement), maximum 16 frames are necessary for each search stage. That is, lens movement for auto-focusing may require a time duration corresponding to 32 frames in total.

Compared to a digital camera, a mobile terminal has a smaller lens aperture and requires a longer exposure time (frame time, $t_{frame}$) to pass a minimum amount of incident light for image formation. The shutter speed of the mobile terminal is 15 frames per second. When a conventional hill-climbing search algorithm is used, a significant time duration of 2.13 seconds would be required for focusing in the mobile terminal.

A voice-coil motor has advantages in terms of a short response time suitable for translation motion, a relatively long stroke suitable for miniaturization, and high-precision position control. However, several parameters such as the lens weight, lens size and lens inertia cause a time delay in the lens movement to a desired target position. In particular, hysteresis characteristics of the voice-coil motor and lens inertia cause a generation of different focus values under identical conditions.

As described above, a direct application of a conventional auto-focusing method to a mobile terminal using a voice-coil motor may cause inaccurate lens focusing.

SUMMARY OF THE INVENTION

The present invention provides a mobile terminal and auto-focusing method for the same which enable rapid and accurate lens focusing through compensation of lens position errors caused by the characteristics of a voice-coil motor described above.

The present invention also provides a mobile terminal and auto-focusing method for the same which enable rapid and accurate lens focusing through an enhanced hill-climbing search procedure.

In accordance with an exemplary embodiment of the present invention, there is provided an auto-focusing method using a lens position error compensation for a mobile terminal having a camera module. The method includes: detecting a target object during a photograph mode; finding a lens position at which a focus value gradient related to the detected target object changes sign while moving a lens of the camera module in units of one step size; and performing lens position compensation by moving the lens to the found lens position.

In accordance with another exemplary embodiment of the present invention, there is provided an auto-focusing method using a lens position error compensation for a mobile terminal having a camera module. The method includes: setting a search start point to a lens position at which focus values start to change; detecting a target object during a photograph mode; finding a first lens position at which a focus value gradient related to the detected target object changes sign while moving forwards from the search start point a lens of the camera module in units of a first step size, and moving the lens to the found first lens position; finding a second lens position at which the focus value gradient changes sign while moving backwards from the first lens position the lens in units of a second step size less than the first step size, and moving the lens to the found second lens position; and finding an optimum focus lens position corresponding to a maximum focus value while moving forwards from the second lens position the lens in units of a third step size less than the second step size, and moving the lens to the found optimum focus lens position.

In accordance with another exemplary embodiment of the present invention, there is provided a mobile terminal supporting auto-focusing through lens position error compensation. The terminal includes: a camera module comprising a lens for detecting a target object during a photograph mode, a voice-coil motor for moving the lens, and an image signal processor for calculating a focus value and a focus value gradient related to the detected target object; and a control unit for setting a search start point to a lens position at which focus values start to change, finding a lens position at which the gradient of the focus value curve changes sign while moving from the search start point the lens in units of one step size, and performing lens position compensation by moving the lens to the found lens position.

BRIEF DESCRIPTION OF THE DRAWINGS

The above features and advantages of the present invention will be more apparent from the following detailed description in conjunction with the accompanying drawings, in which:

FIG. 4C illustrates operation of a voice-coil motor in the camera module;

DETAILED DESCRIPTION OF EXEMPLARY EMBODIMENTS

Figure 1:
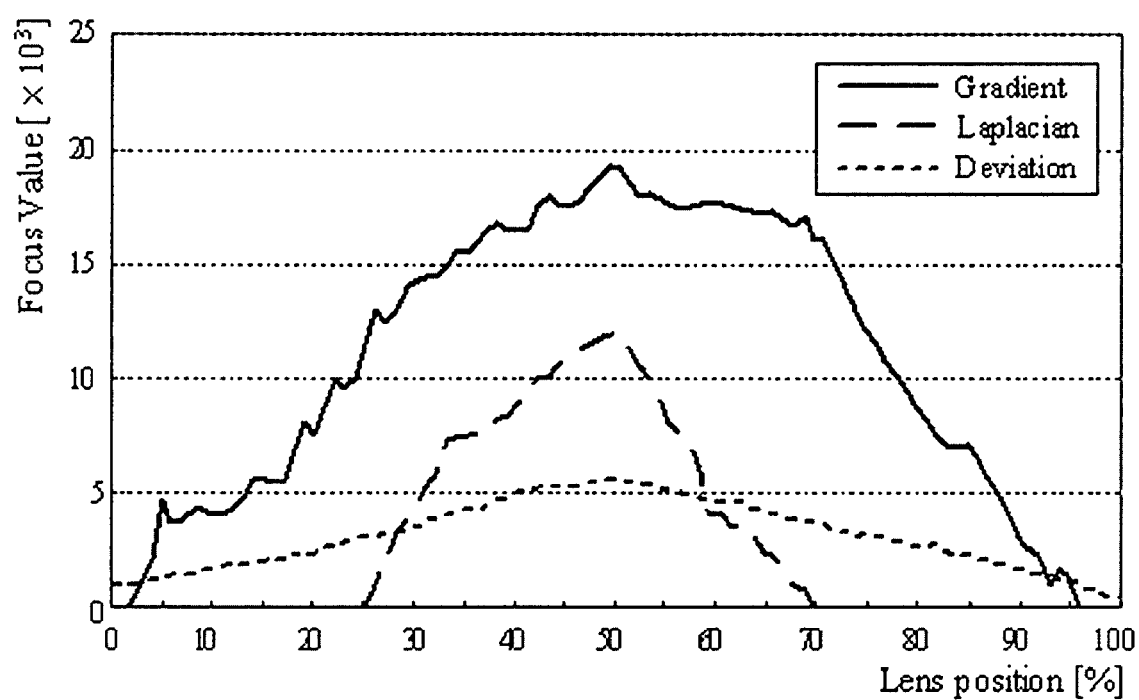
FIG. 1 is a graph illustrating a lens position-to-focus value relation in a conventional mobile terminal.

Hereinafter, exemplary embodiments of the present invention are described in detail with reference to the accompanying drawings. The same reference symbols identify the same or corresponding elements in the drawings. For the purposes of clarity and simplicity, detailed descriptions of constructions or processes known in the art may be omitted to avoid obscuring the invention in unnecessary detail.

To help understand the invention, the following definitions are used. In particular, the 'focus value' represents a performance measure for image focus. The focus value is calculated using the intensity gradient or gradient energy. The focus value can be defined by Equation 1.

$$FV = \sum_x \sum_y |g(x,y)|$$

$$nr\ FV_{energy} = \sum_x \sum_y |g(x,y)|^2 \qquad \text{Equation 1}$$

, where FV is a focus value, $FV_{energy}$ represents an FV based on energy content, and $g(x, y)$ represents the gradient of image intensity at a location $(x, y)$. $FV_{energy}$ represents more effective than FV for distinguishing in-focus images from out-of-focus images.

The gradient of image intensity of a pixel can be computed using Equation 2.

$$\begin{cases} g(x) = (\vec{\alpha}_1 \vec{\alpha}_2 \vec{\alpha}_i) \times f(x,y)_{3\times 3} \\ g(y) = (\vec{\alpha}_1 \vec{\alpha}_2 \vec{\alpha}_i)^2 \times f(x,y)_{3\times 3} \end{cases} \qquad \text{Equation 2}$$

, where $f(x, y)_{3\times 3}$ represents a 3×3 matrix of image data at a location $(x, y)$, $\vec{\alpha}_1, \vec{\alpha}_2, \vec{\alpha}_3$, represent 3×1 matrices of weighting coefficients.

Selection of coefficients $\vec{\alpha}_1, \vec{\alpha}_2, \vec{\alpha}_3$ enables various kinds of gradients. For example, when $\vec{\alpha}_1 = (-1,-2,-1)^T$, $\vec{\alpha}_2 = (0,0,0)^T$, $\vec{\alpha}_3 = (1,2,1,)^T$, a Sobel gradient, a special form of a Tenengard gradient, is obtained. When $\vec{\alpha}_1 = (0,-1,0)^T$, $\vec{\alpha}_2 = (0,1,0)^T, \vec{\alpha}_3 = (0,0,0)^T$, a Robert gradient is obtained, and further, a Laplacian gradient is obtained if $f(x, Y)_{3\times 3}$ is replaced with a first order derivative of the original image data. When $\vec{\alpha}_1 = (0,\vec{\alpha}_1,0)^T, \vec{\alpha}_2 = (0,\vec{\alpha}_2,0)^T, \vec{\alpha}_3 = (0,\vec{\alpha}_3,0)^T$, a frequency selective weighted median gradient is obtained through median filtering of the original image data.

The 'initial lens position' for a camera module having a voice-coil motor (VCM) refers to the position of a lens when no current is applied to the VCM.

Figure 3:
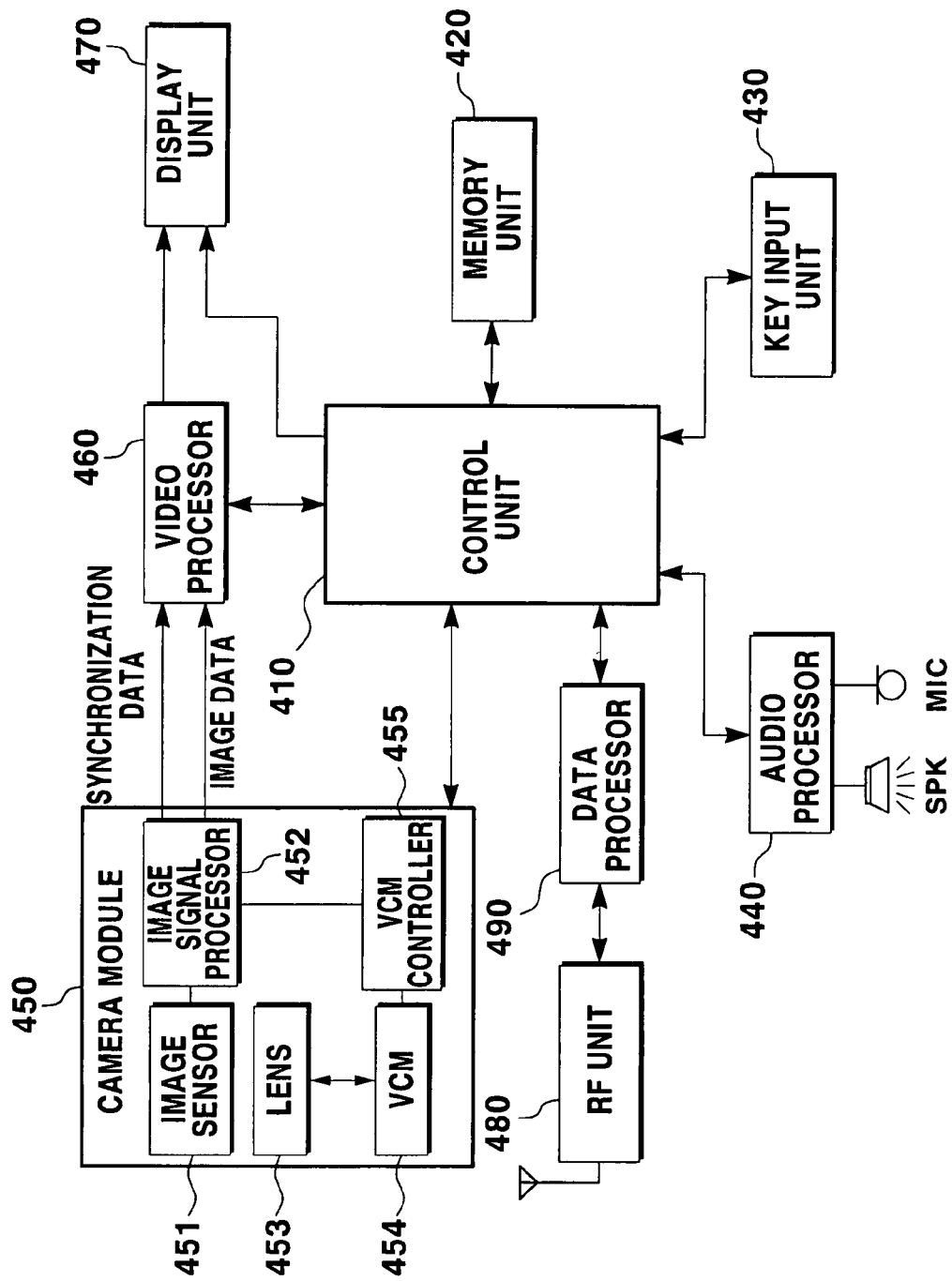
FIG. 3 illustrates a configuration of a mobile terminal supporting the lens position error compensation according to an exemplary embodiment of the present invention.

FIG. 3 illustrates a configuration of a mobile terminal using a lens position error compensation according to an exemplary embodiment of the present invention.

Referring to FIG. 3, the mobile terminal includes a control unit 410, memory unit 420, key input unit 430, radio frequency (RF) unit 480, data processor 490, audio processor 440, camera module 450, video processor 460, and display unit 470.

The control unit 410 controls the overall operation of the mobile terminal. The control unit 410 is coupled to the memory unit 420, data processor 490, audio processor 440, camera module 450, video processor 460, and display unit 470 for data exchange and call processing. In particular, the control unit 410 controls the auto-focusing of the camera module 450.

The memory unit 420 stores programs and associated data for controlling the overall operation of the mobile terminal, and temporarily stores data resulting from operation of the mobile terminal. In particular, the memory unit 420 stores lens position data and an application program for auto-focusing.

The key input unit 430 includes a plurality of alphanumeric and function keys for inputting alphanumeric information such as telephone numbers and for setting various functions. The function keys include an execute key for activating a photograph mode and a shutter key for auto-focusing and photographing.

The RF unit 480 performs wireless communication operations for the mobile terminal. The RF unit 480 includes an RF transmitter for upconverting the frequency of a signal to be transmitted and amplifying the signal, and an RF receiver for low-noise amplifying a received signal and downconverting the frequency of the signal.

The data processor 490 encodes and modulates a signal to be transmitted, and demodulates and decodes a received signal. The data processor 490 may include a modulator/demodulator (modem) and a coder/decoder (codec). The codec includes a data codec for processing packet data, and an audio codec for processing an audio signal such as a voice signal. The data processor 490 may be included in the control unit 410.

The audio processor 440 reproduces an audio signal from the audio codec of the data processor 490 through a speaker SPK, and sends an input audio signal from a microphone MIC to the audio codec of the data processor 490.

The camera module 450 generates image data by photographing a target object and provides an auto-focusing function to facilitate photographing.

The video processor 460 generates screen data using image data from the camera module 450 in a format consistent with the specifications of the display unit 470. The video processor 460 processes image data in units of a frame, and outputs frame image data to the display unit 470. The video processor 460 includes an image codec for compressing frame image data in a predetermined format and decompressing the compressed frame image data. The image codec may be a Joint Photographic Experts Group (JPEG) codec, Moving Picture Experts Group (MPEG) codec, or wavelet codec. The video processor 460 may also perform an on screen display (OSD) function, and output OSD data corresponding to the picture size under the control of the control unit 410.

The display unit 470 displays image data from the video processor 460, and data from the control unit 410 on a screen. The display unit 470 may include a panel of liquid crystal display (LCD) devices, LCD controller, and memory device for storing image data to be displayed. If the panel has a touch screen capability, the display unit 470 can also act as an input means.

Figure 4A:
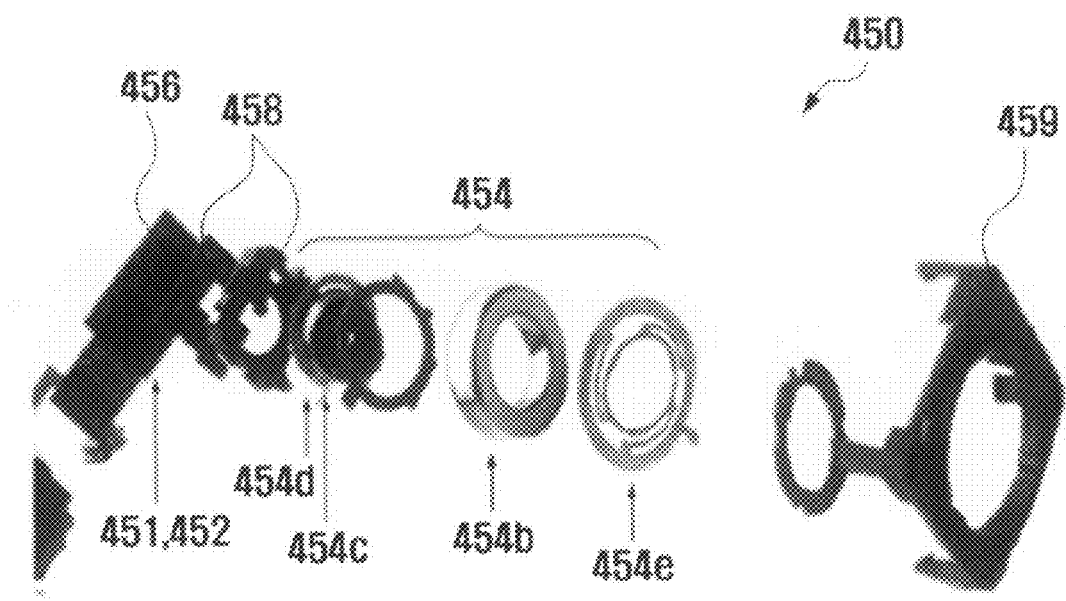
FIG. 4A is an exploded perspective view of a camera module in the mobile terminal of FIG. 3.
Figure 4B:
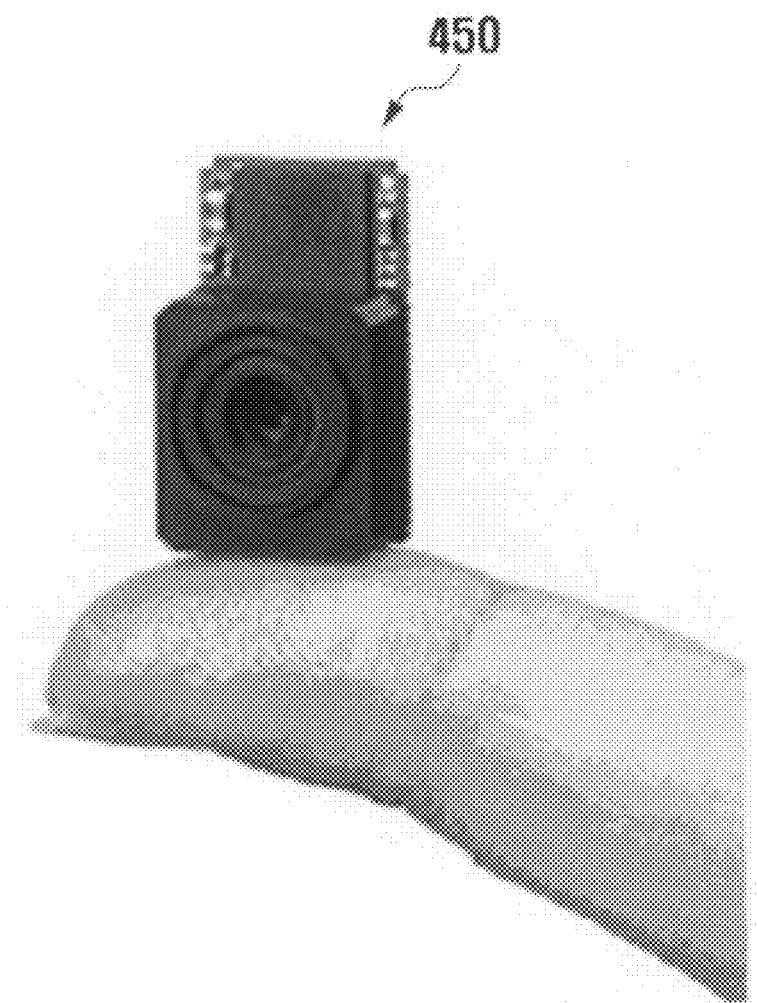
FIG. 4B is a perspective view of the camera module.

In particular, as shown in FIGS. 4A to 4C, the camera module 450 includes a base substrate 456, image sensor 451, image signal processor 452, lens 453, VCM 454, and VCM controller 455.

The base substrate 456 is made of a flexible tape substrate. The image sensor 451 and the image signal processor 452 are mounted on a surface of the base substrate 456. The lens 453 is installed above the image sensor 451 and collects light to form an image of a target object. The image sensor 451 converts an optical signal corresponding to the formed image into an analog electrical signal. The image sensor 451 may be a charge-coupled device (CCD) sensor or a complementary metal-oxide-semiconductor (CMOS) sensor. The image signal processor 452 converts the analog electrical signal from the image sensor 451 into a digital signal, and calculates focus values. The image signal processor 452 may be a digital signal processor (DSP). The image sensor 451 and image signal processor 452 may be realized as a single body or as separate bodies. The VCM 454 is installed on the base substrate 456 outside the image sensor 451, and moves the lens 453 toward and away from the image sensor 451. The VCM controller 455 controls the position of the lens 453, and includes a digital/analog converter and a constant current circuit to supply a constant current to the VCM 454 for controlling the lens position. The lens 453 and VCM 454 are installed in a lower case 459.

The VCM 454 moves the lens 453 in a single direction and includes a permanent magnet 454b, voice coil 454c, and a pair of leaf springs 454d and 454e. The permanent magnet 454b provides an installation space 454a in the form of a ring, and has a circular opening at a central region for installing and moving the lens 453. The voice coil 454c is embedded in the installation space 454a of the permanent magnet 454b. The leaf springs 454d and 454e are installed near to the opposite ends of the permanent magnet 454b, and are respectively coupled to the edge portions of two surfaces of the lens 453 projecting from the opening of the permanent magnet 454b.

The VCM 454 adjusts the force F induced by applying a current to the voice coil 454c that is in a magnetic field of the permanent magnet 454b, and the restoring force of the leaf springs 454d and 454e, to precisely move the lens 453 in one direction from the initial position. That is, when a current is applied to the voice coil 454c, the lens 453 is moved from the initial position toward a target object. When the current to the voice coil 454c is reduced, the lens 453 is moved backwards by the restoring force of the leaf springs 454d and 454e to the initial position.

Referring to FIG. 4C, when a current is initially applied to the voice coil 454c in a magnetic field of the permanent magnet 454b, a force F moving the lens 453 in a forward direction from the start position is induced according to the Fleming's left hand rule for electric motors. At the same time, a restoring force of the leaf springs 454d and 454e is exerted in the opposite direction of the force F induced by the current. Hence, the lens 453 moves forwards and stops when a state of equilibrium is reached between the force F induced by the current and the restoring force of the leaf springs 454d and 454e.

When the lens 453 is displaced at a distance, if the current to the voice coil 454c is reduced, the force F becomes weaker than the restoring force. Hence, the lens 453 moves backwards and stops when a new state of equilibrium is reached between the force F induced by the reduced current and the restoring force of the leaf springs 454d and 454e. Further, if the current to the voice coil 454c is shut off, the lens 453 is moved by the restoring force of the leaf springs 454d and 454e back to the initial lens position. Accordingly, the VCM 454 moves the lens 453 in one direction, and the leaf springs 454d and 454e moves the lens 453 in the opposite direction.

The control unit 410 sets a search start point to a lens position at which the focus value begins to change according to the initiation of lens movement. A search operation is not necessary before the focus value begins to change. Hence, the search start point is set so as to avoid an unnecessary search operation for search time reduction. The search start point may be set during the manufacturing process or a photograph mode setting operation.

From the search start point, the control unit 410 repeatedly moves the lens 453 in units of one step size to find a lens position at which the gradient of the focus value, with respect to a desired target object, changes sign. The control unit 410 then moves the lens 453 to the lens position at which the gradient sign change is detected, for lens position correction.

During this procedure, the image signal processor 452 of the camera module 450 calculates focus values before and after each lens move, and calculates the gradient of the focus value at the current lens position using the difference between the current focus value and the previous focus value until a change in the sign of the gradient of the focus value is detected. The direction of lens movement to detect a gradient sign change is opposite to that of lens movement to the lens position corresponding to the gradient sign change.

In the present invention, the optimum focus value is found through a three-stage process. In each stage, the control unit 410 repeatedly moves the lens 453 in units of one step size until the gradient of the focus value changes sign, and then moves the lens 453 in a reversed direction to the lens position corresponding to the gradient sign change. Step sizes are reduced in stages. For example, step sizes are +16, −7 and +1 for the first stage, second stage and third stage, respectively.

Figure 5A:
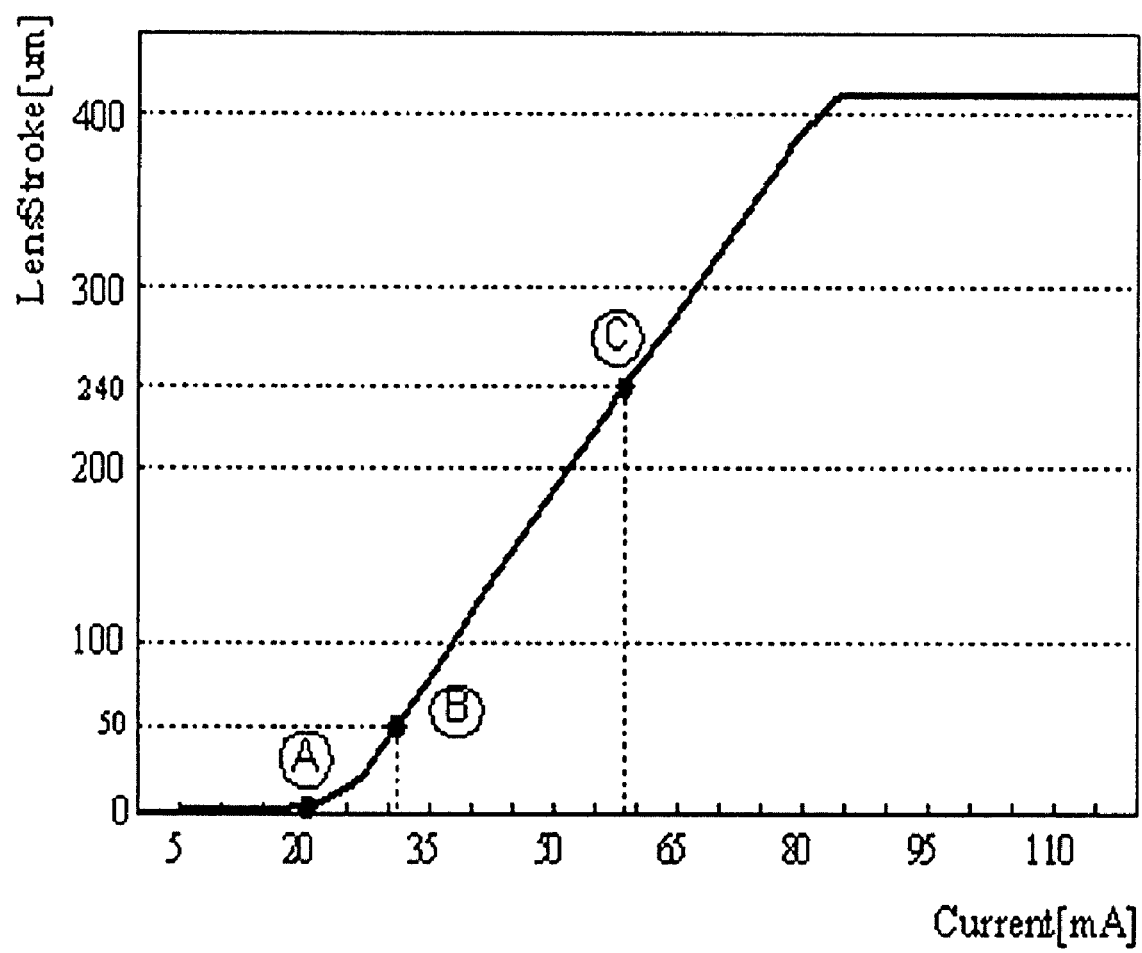
FIG. 5A illustrates a graph of an applied current-lens position relation.
Figure 5B:
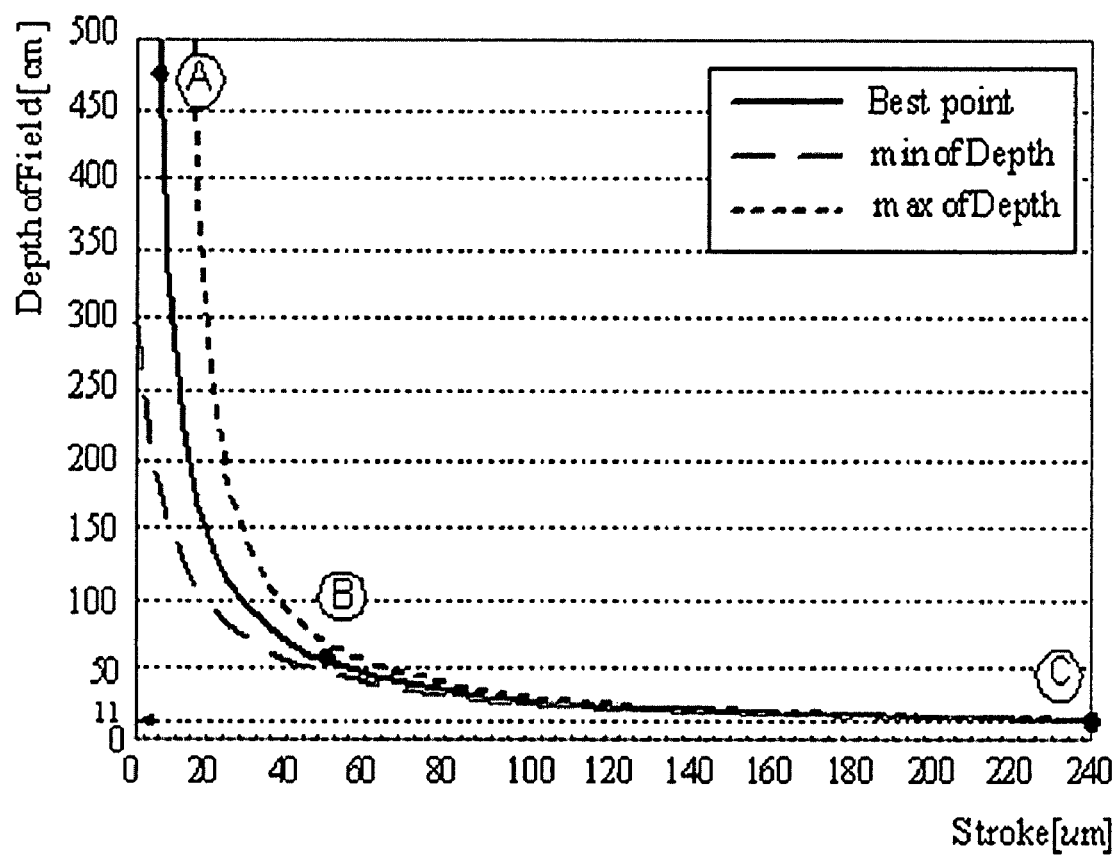
FIG. 5B illustrates a graph of a relation between lens positions and depth-of-field values.

FIG. 5A illustrates a graph of an applied current-lens position relation obtained through an experiment using a voice-coil motor to investigate characteristics of the motor. FIG. 5B illustrates a graph of a relation between lens positions and depth-of-field values.

Referring to FIGS. 5A and 5B, when the distance between the camera module and a target object is greater than or equal to 50 cm (between A and B), the lens displacement is less than or equal to 50 μm and the applied current is less than or equal to 35 mA. When the lens displacement is 240 μm (C), the optimum depth-of-field value is 11 cm. Hence, it can be understood that lens movement of 10~240 μm using a VCM enables auto-focusing within distances of 10~500 cm between the lens and a target object.

Figure 6:
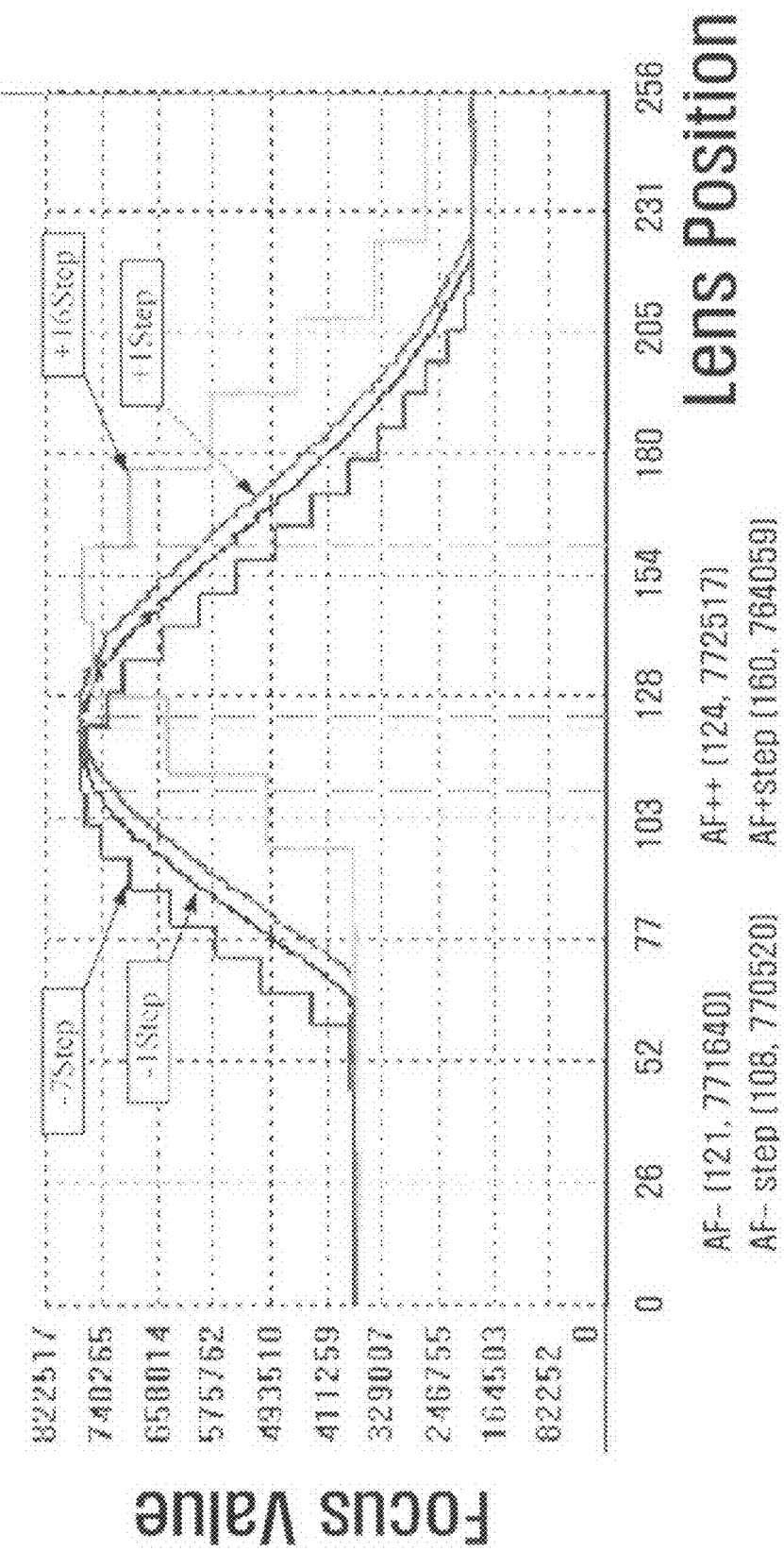
FIG. 6 illustrates a graph of focus values in relation to the characteristics of the voice-coil motor of FIG. 4B.

FIG. 6 illustrates a graph of focus values in relation to the characteristics of the voice-coil motor. As shown, a test image as a target object is placed at a distance of 20 cm from the camera module, and the lens is moved in units of step sizes of +16, +1, −1 and −7 while the current applied to the voice-coil motor is maintained at the same level. Along the horizontal axis, lens positions are marked in units of an interval corresponding to 1/256 of the maximum lens displacement. Along the vertical axis, focus values are marked. Four step sizes (AF+ for +16, AF++ for +1, AF−− for −1, and AF− for −7) are used, and corresponding maximum focus values are listed.

Figure 2:
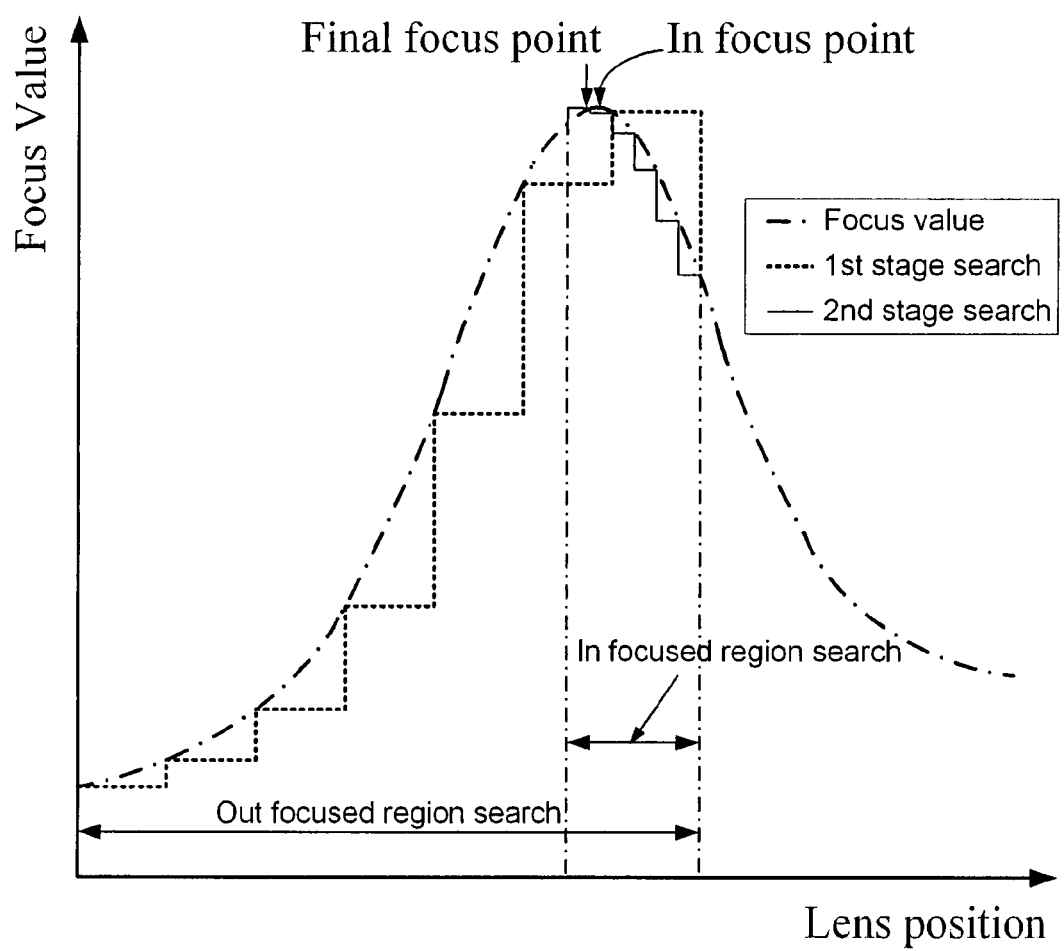
FIG. 2 illustrates an auto-focusing process using a conventional hill-climbing search algorithm.

Although step sizes are different from each other, focus value curves must correspond in shape to that of FIG. 2 under the same applied current. From FIG. 6, it can be understood that focus value curves correspond in shape to that of FIG. 2 and lens positions producing maximum focus values are widely different from each other (160 for AF+, 124 for AF++, 121 for AF−−, and 108 for AF−). Lens positions producing maximum focus values must be close to each other even in different step sizes.

The widely different lens positions in different step sizes may result from lens position errors caused by inertia due to lens weight and lens movement direction, current delay due to the voice coil, and VCM characteristics such as hysteresis. As a result, a direct application of the conventional hill-climbing search procedure to a mobile terminal using a voice-coil motor for auto-focusing may lengthen the search time because of the presence of a redundant search section, and further lead to non-optimal focusing.

Figure 7:
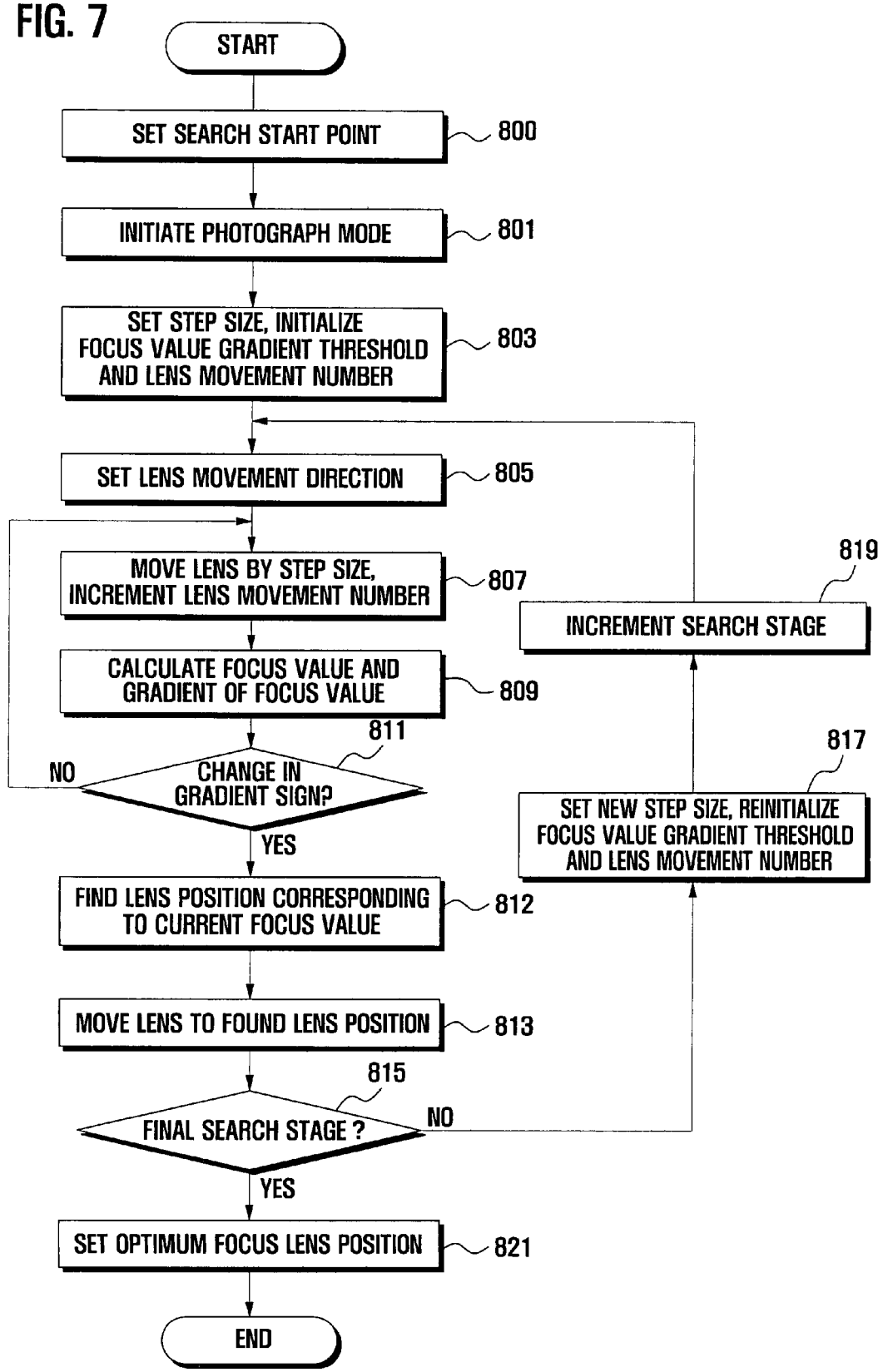
FIG. 7 is a flow chart illustrating an auto-focusing method using a lens position error compensation according to another exemplary embodiment of the present invention.

FIG. 7 is a flow chart illustrating an auto-focusing method using a lens position error compensation scheme according to another exemplary embodiment of the present invention. The inventive auto-focusing method reduces a redundant search section.

Referring to FIGS. 3 and 7, he control unit 410 sets a search start point to a lens position at which the focus value starts to change (800). When the user initiates a photograph mode for photographing and issues a command to photograph a target object by pressing a shutter key, the control unit 410 performs auto-focusing before the actual photographing (801). Auto-focusing is performed through a three-stage hill-climbing search process.

Firstly, the control unit 410 performs a first-stage search process. The control unit 410 sets a first step size for the first-stage search process, and initializes a focus value gradient threshold and the number of lens moves (803). The first step size is greater than those of second and third stage search processes, for rapidly finding a rough lens position causing a change in the sign of the focus value gradient.

The control unit 410 sets a lens movement direction to a forward direction in the first stage search procedure (805). The lens movement direction is either the forward direction toward a target object or the backward direction toward the initial lens position.

The control unit 410 moves the lens 453 by the current step size and increments the number of lens moves in the first-stage search procedure (807). The number of lens moves may be used for adjusting the maximum number of frames per unit time.

The image signal processor 452 calculates a current focus value and the gradient of the focus value using image data of a target object from the image sensor 451 (809). The current focus value is calculated using Equations 1 and 2, and the gradient of the focus value is calculated using the difference between the current focus value and previous focus value. In the first-stage search process, the sign of the gradient of the focus value is positive until the lens 453 passes a lens position producing the maximum focus value.

The control unit 410 checks whether a change in the sign of the gradient of the focus value is detected (811). If no change in the sign of the gradient is detected, the control unit 410 repeats steps 807 and 809.

If a change in the sign of the gradient is detected, the control unit 410 performs the lens position error compensation. That is, the control unit 410 finds a first lens position corresponding to the current focus value (812). The control unit 410 then moves the lens 453 to the found first lens position (813). Because of VCM characteristics previously described, the current position of the lens 453 is closer to the target object than the first lens position. The control unit 410 skips searching between the current lens position and first lens position by moving the lens 453 backwards to the first lens position at step 813.

The control unit 410 checks whether the current search stage is the final search stage (815). Because the current search stage is the final search stage, the control unit 410 sets the optimum focus lens position to the third lens position.

For the second-stage search process, the control unit 410 sets a second step size, and reinitializes the focus value gradient threshold and the number of lens moves (817). The second step size is less than the first step size.

The control unit 410 increments the search stage (819). That is, the current search stage becomes the second search stage.

The control unit 410 resets the lens movement direction to a backward direction for the second stage search procedure (805).

The control unit 410 performs steps 807 to 811 in a manner similar to those of the first-stage search process until a change in the sign of the gradient of the focus value is detected. Upon detection of a change in the sign of the gradient, the control unit 410 finds a second lens position corresponding to the current focus value (812), and moves the lens 453 forwards to the found second lens position (813).

The control unit 410 checks whether the current search stage is the final search stage (815). Because the current search stage is not the final search stage, the control unit 410 proceeds to the next search stage.

For the third-stage search process, the control unit 410 sets a third step size, and reinitializes the focus value gradient threshold and the number of lens moves (817). The third step size is less than the second step size, and may be set to +1 for fine focusing by reducing lens position errors due to lens inertia.

The control unit 410 increments the search stage (819). That is, the current search stage becomes the third search stage.

The control unit 410 resets the lens movement direction to a forward direction for the third stage search procedure (805).

The control unit 410 performs steps 807 to 811 in a manner similar to those of the first-stage search process until a change in the sign of the gradient of the focus value is detected. Upon detection of a change in the sign of the gradient, the control unit 410 finds a third lens position corresponding to the current focus value (812), and moves the lens 453 backwards to the found third lens position (813).

The control unit 410 checks whether the current search stage is the final search stage (815). Because the current search stage is the final search stage, the control unit 410 sets the optimum focus lens position to the third lens position (821).

Figure 8:
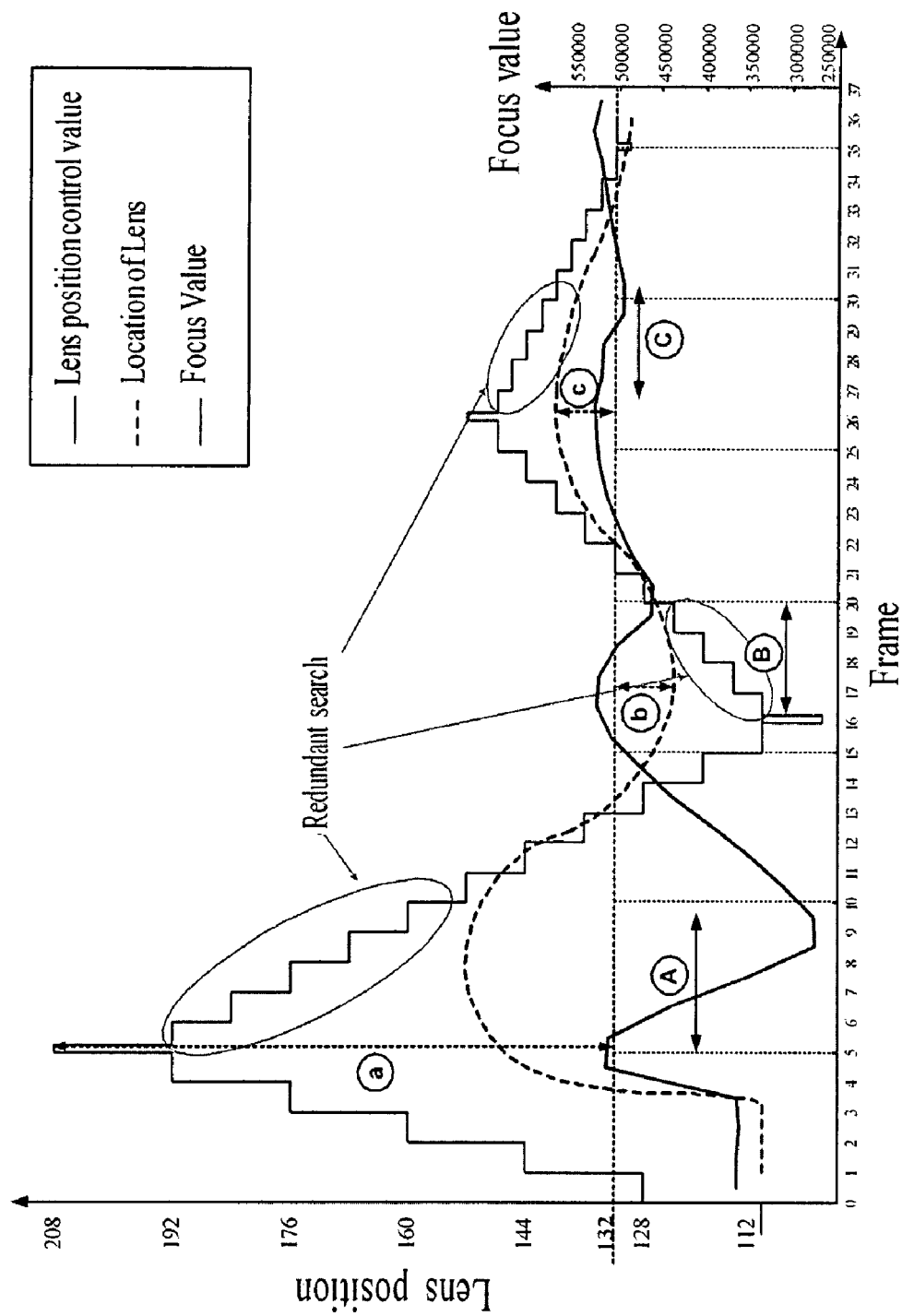
FIG. 8 illustrates the necessity of a lens position error compensation in terms of lens positions and the number of frames.

In each search stage, at steps 812 and 813, upon detection of a change in the sign of the gradient of the focus value, a lens position corresponding to the current focus value is found, and the lens 453 is moved from the current position to the found lens position. This is to skip searching in a redundant search section between the current lens position and found lens position. That is, if steps 812 and 813 are not performed, as illustrated in FIG. 8, redundant search sections (A, B and C) corresponding to 6~15 frames are present. Because of a time delay due to VCM characteristics, maximum focus values (a, b and c) appear at applied current values greater than control current values. Further, redundant search sections (A, B and C) are present after detection of a change in the sign of the gradient of the focus value.

In the present invention, lens position errors are compensated in proportion to the step sizes and the number of lens moves. A lens position error compensation after detection of a change in the sign of the focus value gradient enables skipping of search in a redundant search section corresponding to 6~15 frames for each search stage. Therefore, the overall auto-focusing time can be reduced.

In addition, the three-stage hill-climbing search process of the present invention enables an easier lens position error compensation and a more rapid auto-focusing in comparison to a conventional two-stage search process having a wide difference between the first step size and second step size.

Figure 9:
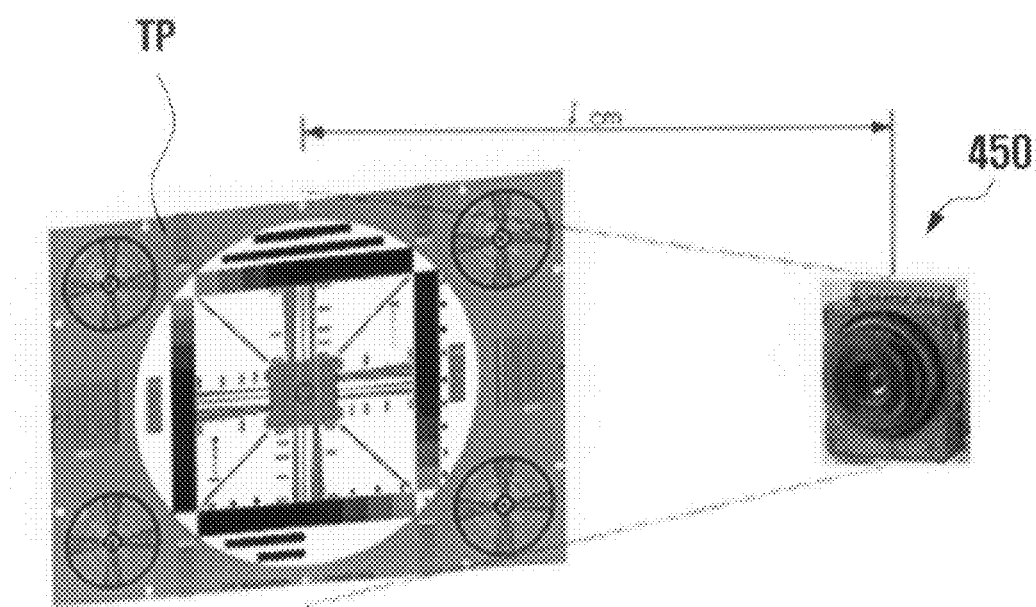
FIG. 9 illustrates a test configuration to evaluate the performance of the auto-focusing method of FIG. 7.

FIG. 9 illustrates a test configuration to evaluate the performance of the auto-focusing method of FIG. 7. In FIG. 9, a test pattern (TP) is placed before a camera module 450. The camera module 450 is a LZ0P3731 camera module including a CCD image sensor and a VCM. The image signal processor is a TM320DM270 multimedia processor designed for a mobile terminal. The test pattern is the EIA resolution chart 1956. The distance between a lens of the camera module 450 and the test pattern is denoted by l (cm). FIGS. 10 to 12B are related to experiments using the test configuration.

Figure 10:
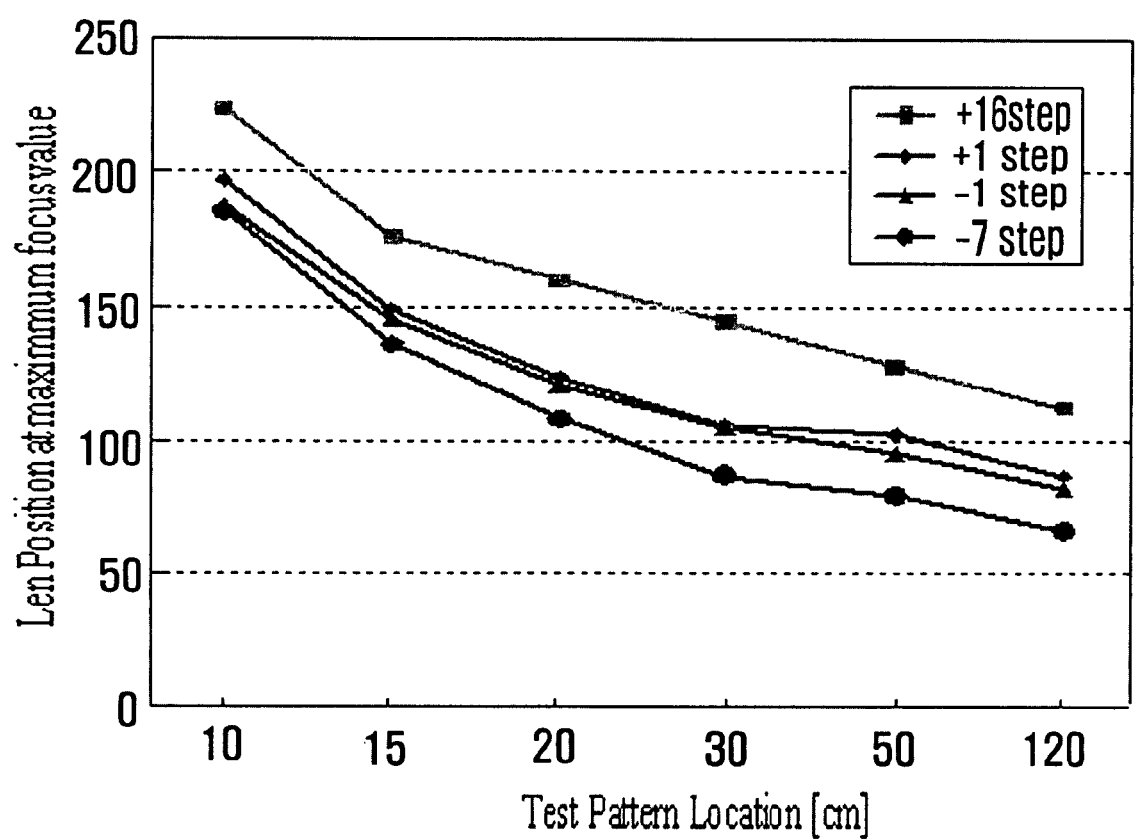
FIG. 10 illustrates relations between distances from the lens to a test image and corresponding lens positions producing maximum focus values.

FIG. 10 illustrates relations between distances from the lens to the test pattern and corresponding lens positions producing maximum focus values.

Referring to FIG. 10, maximum focus lens positions are widely different according to step sizes because of VCM characteristics described in connection with FIG. 6. The maximum focus lens positions are in inverse proportion to distances l between the lens and the test pattern. Lens movement has resulted in fine image enlargement and reduction (zoom-in and zoom-out effects).

Figure 11:
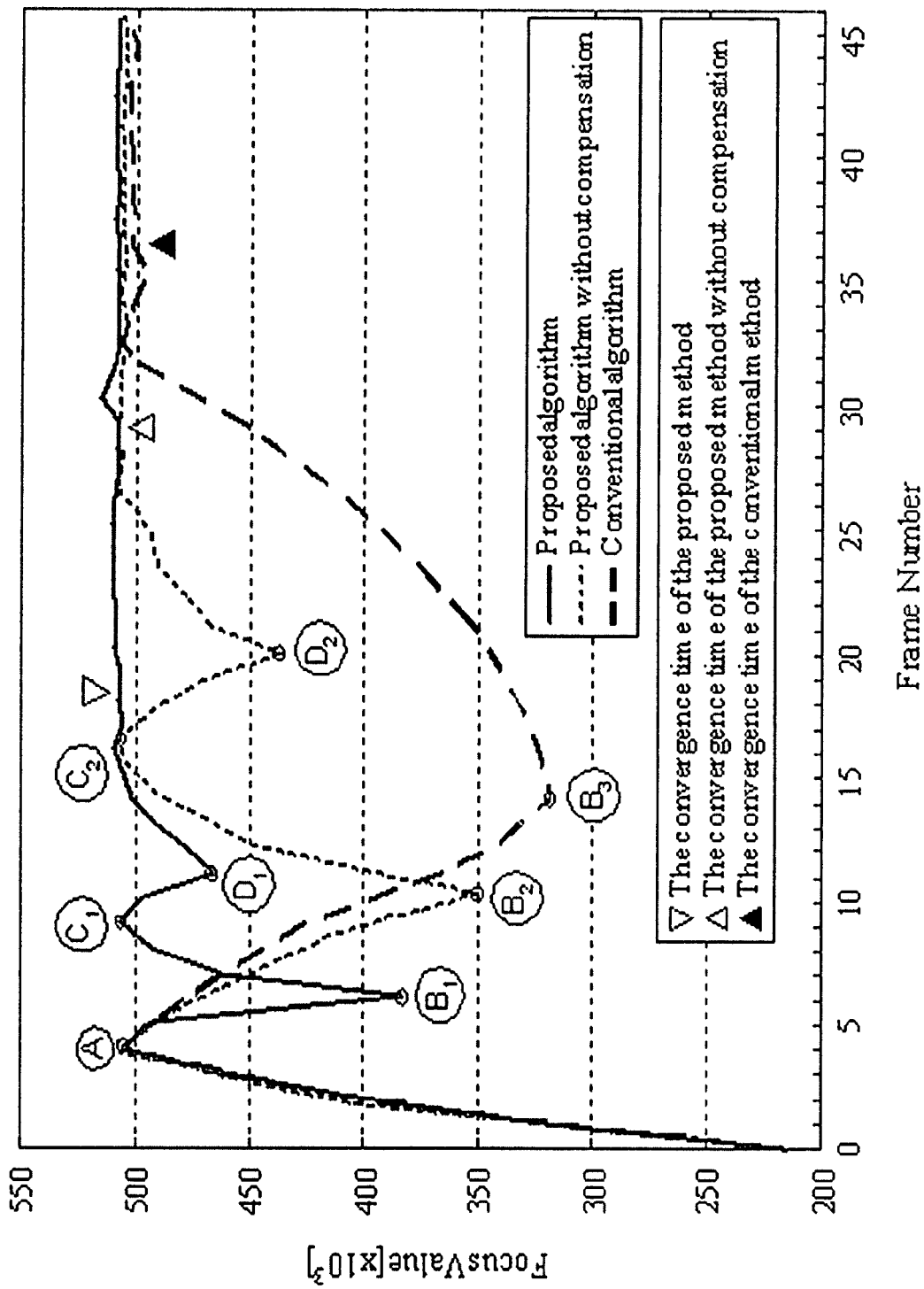
FIG. 11 illustrates convergence times and focus values obtained from a conventional auto-focusing method and the auto-focusing method of FIG. 7.
Figure 12A:
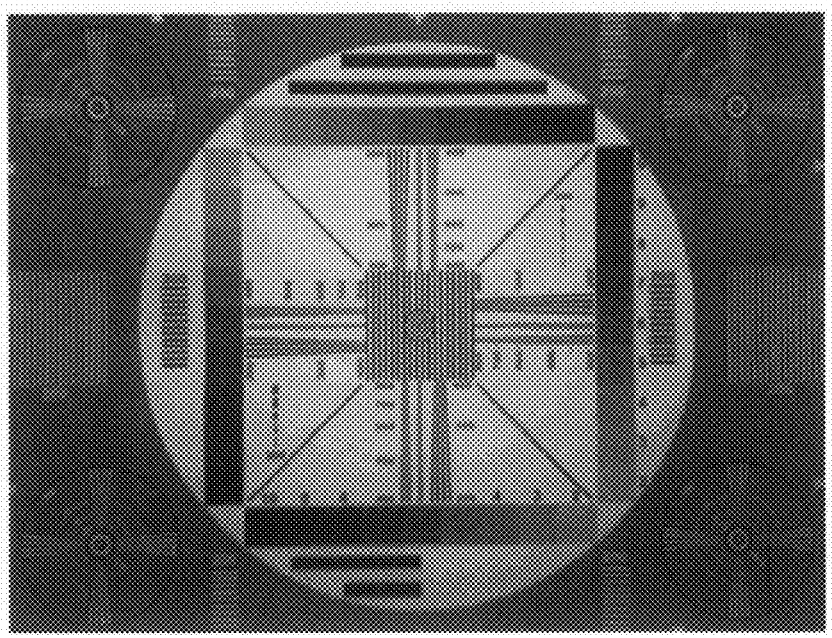
FIG. 12A is an output image produced by the conventional auto-focusing method of FIG. 11.
Figure 12B:
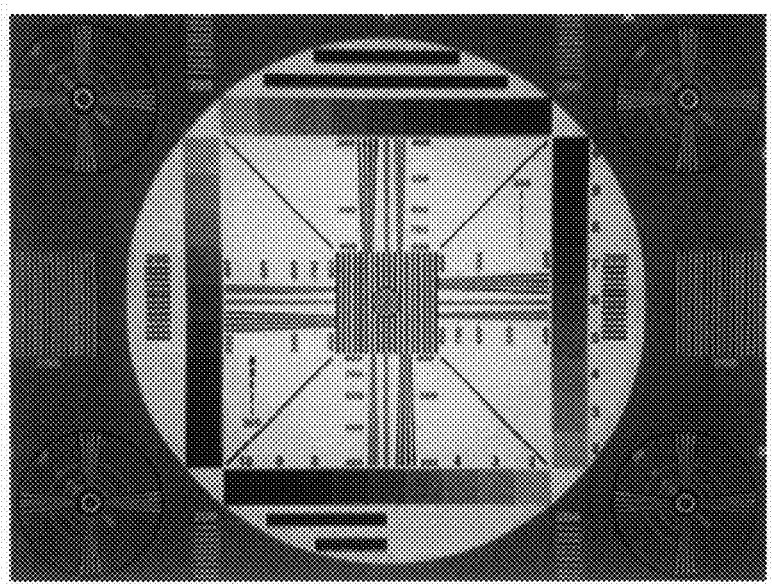
FIG. 12B is an output image produced by the auto-focusing method of FIG. 7.

FIG. 11 illustrates convergence times and focus values obtained from a conventional auto-focusing method and the auto-focusing method of the present invention. As shown, the horizontal axis denotes the number of frames per unit time, and the vertical axis denotes measured focus values. A dashed line denotes focus values obtained from a conventional two-stage auto-focusing method. A dotted line denotes focus values obtained from the three-stage auto-focusing method of the present invention without the lens position error compensation. A solid line denotes focus values obtained from the three-stage auto-focusing method of the present invention with the lens position error compensation. In the three methods, the first step sizes are the same and set to 30, and the search start points are the same and set to +16. The second step size for the conventional method is set to −2. The second and third step sizes are +7 and −1, respectively, for the two methods of the present invention.

In the first stage search, search times from the start to a point 'A' are the same and 4 frames for the three methods because the first step sizes are the same (30), and the search start points are the same (+16).

Focus values of the three methods are continuously decreasing for a while after passing their maximum points and detection of their gradient sign changes. This may be caused by VCM characteristics described previously.

In the second stage search, after changes in the lens movement directions due to reversal of current flows, focus values are back to normal at a point $B_1$ (solid line, step size −7), point $B_2$ (dotted line, step size −7) and point $B_3$ (dashed line, step size −2). The method of the present invention with the lens position error compensation presents the shortest back-to-normal time after reversal of the current flow to the VCM. The conventional method presents the longest back-to-normal time. In the conventional method, focus values change slowly owing to the small second step size of −2, thereby resulting in a longer search time for finding the maximum focus lens position. It can be understood that the second stage search using an intermediate step size of −7 reduces back-to-normal time.

Focus values computed by the method of the present invention have reached a steady-state in the shortest time. This is because redundant search sections are removed through the lens position error compensation. That is, redundant search sections are removed between $B_1$ and $C_1$ and between $B_2$ and $C_2$, between $C_1$ and $D_1$, and between $C_2$ and $D_2$. Removal of a redundant search section in each search stage leads to shortening of the overall auto-focusing time.

In the case of a mobile terminal having a frame rate of 15, to find optimum focus lens positions, the conventional method takes 2.4 seconds (corresponding to 36 frames); the inventive method without the lens position error compensation takes 1.9 seconds (corresponding to 29 frames, and time reduction by 0.5 second in comparison to the conventional method); and the inventive method with the lens position error compensation takes 1.1 seconds (corresponding to 17 frames, and time reduction by 1.3 seconds in comparison to the conventional method).

Further, the inventive method with the lens position error compensation has produced the optimum focus value of 510,000, which is higher by 10,000 than the optimum focus value of 500,000 in the conventional method. Consequently, the inventive method has produced a final output image of FIG. 12B, which is clearer than that of FIG. 12A produced by the conventional method, thus implying better imaging performance. The final output image of FIG. 12B looks larger than that of FIG. 12A because images formed by the image sensor are different from each other owing to different lens positions.

As apparent from the above description, the present invention provides a mobile terminal and auto-focusing method for the same that enable rapid and fine auto-focusing through a three-stage search process. During the search process, lens position errors are compensated in proportion to step sizes and the number of lens moves, and redundant search sections generated by characteristics of a voice coil motor are skipped during the search mode.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. An auto-focusing method using a lens position error compensation for a mobile terminal having a camera module, comprising:

detecting a target object during a photograph mode;

determining a lens position at which a focus value gradient related to the detected target object changes sign while moving a lens of the camera module in units of one step size; and performing a lens position compensation by moving the lens to the determined lens position.

2. The auto-focusing method of claim 1, wherein determining the lens position comprises:

calculating focus values immediately before and after a recent lens move by the step size;

calculating the focus value gradient using a difference between the calculated focus values; and checking whether the focus value gradient changes sign.

3. The auto-focusing method of claim 2, wherein determining the lens position further comprises finding, if the focus value gradient changes sign, a lens position corresponding to the focus value calculated immediately after the recent lens move.

4. The auto-focusing method of claim 3, wherein a lens movement direction for the lens position compensation is opposite to that for gradient sign change detection.

5. The auto-focusing method of claim 4, wherein the gradient sign change detection and the lens position compensation are iterated a number of times and a final lens position found through the iteration is selected as an optimum focus lens position.

6. The auto-focusing method of claim 5, wherein the lens movement direction is reversed and the step size is reduced for each iteration of the gradient sign change detection and the lens position compensation.

7. The auto-focusing method of claim 6, wherein the gradient sign change detection and the lens position compensation are iterated three times.

8. The auto-focusing method of claim 7, wherein the step size is +16, −7, and +1, respectively, at first iteration, second iteration, and third iteration of the gradient sign change detection and the lens position compensation.

9. The auto-focusing method of claim 1, further comprising setting a search start point to a lens position at which focus values start to change.

10. An auto-focusing method using a lens position error compensation for a mobile terminal having a camera module, comprising:

setting a search start point to a lens position at which focus values start to change;

detecting a target object during a photograph mode;

determining a first lens position at which a focus value gradient related to the detected target object changes sign while moving forwards from the search start point a lens of the camera module in units of a first step size, and moving the lens to the determined first lens position;

determining a second lens position at which the focus value gradient changes sign while moving backwards from the first lens position the lens in units of a second step size less than the first step size, and moving the lens to the determined second lens position; and determining an optimum focus lens position corresponding to a maximum focus value while moving forwards from the second lens position the lens in units of a third step size less than the second step size, and moving the lens to the determined optimum focus lens position.

11. The auto-focusing method of claim 10, wherein the focus value gradient is determined using a difference between focus values obtained immediately before and after a recent lens move.

12. The auto-focusing method of claim 11, wherein the found first or second lens position corresponds to a focus value obtained immediately after the recent lens move.

13. The auto-focusing method of claim 12, wherein the lens is moved backwards to the determined first lens position.

14. The auto-focusing method of claim 13, wherein the lens is moved forwards to the determined second lens position.

15. The auto-focusing method of claim 14, wherein the lens is moved backwards to the determined optimum focus lens position.

16. The auto-focusing method of claim 10, wherein the first step size is +16, the second step size is −7, and the third step size is +1.

17. A mobile terminal capable of performing auto-focusing through lens position error compensation, comprising:

a camera module including a lens for detecting a target object during a photograph mode, a voice-coil motor for moving the lens, and an image signal processor for calculating a focus value and a focus value gradient related to the detected target object; and a control unit for setting a search start point to a lens position at which focus values start to change, determining a lens position at which the gradient of the focus value curve changes sign while moving from the search start point the lens in units of one step size, and performing lens position compensation by moving the lens to the found lens position.

18. The mobile terminal of claim 17, wherein the image signal processor calculates focus values immediately before and after a recent lens move and also calculates the focus value gradient using a difference between the calculated focus values.

19. The mobile terminal of claim 18, wherein the determined lens position corresponds to the focus value calculated immediately after the recent lens move.

20. The mobile terminal of claim 19, wherein a lens movement direction for lens position compensation is opposite to that for gradient sign change detection.

21. The mobile terminal of claim 20, wherein the control unit iterates a number of times the gradient sign change detection and the lens position compensation and then selects a final lens position determined through the iteration as an optimum focus lens position.

22. The mobile terminal of claim 21, wherein the control unit reverses the lens movement direction and reduces the step size for each iteration of the gradient sign change detection and the lens position compensation.

23. The mobile terminal of claim 22, wherein the control unit iterates three times the gradient sign change detection and the lens position compensation.

24. The mobile terminal of claim 23, wherein the control unit sets the step size to +16, −7, and +1 at first iteration, second iteration, and third iteration of the gradient sign change detection and the lens position compensation, respectively.

* * * * *

UNITED STATES PATENT AND TRADEMARK OFFICE
CERTIFICATE OF CORRECTION

PATENT NO. : 7,693,411 B2
APPLICATION NO. : 11/801672
DATED : April 6, 2010
INVENTOR(S) : Seong Geun Kwon et al.

It is certified that error appears in the above-identified patent and that said Letters Patent is hereby corrected as shown below:

On the Title Page
Item [73], Assignee, should read as follows:

--Samsung Electronics Co., Ltd.--

Signed and Sealed this

First Day of June, 2010

David J. Kappos
*Director of the United States Patent and Trademark Office*